US005512338A

United States Patent [19]
Bianchini et al.

[11] Patent Number: 5,512,338
[45] Date of Patent: Apr. 30, 1996

[54] OXYGEN, FLAVOR/ODOR, GREASE/OIL AND MOISTURE BARRIER FILM STRUCTURES

[75] Inventors: Eber C. Bianchini, Rochester, N.Y.; Anthony R. Knoerzer, Plano, Tex.; Larry A. Parr, Canandaigua; Leland W. Reid, Palmyra, both of N.Y.

[73] Assignee: Mobil Oil Corp., Fairfax, Va.

[21] Appl. No.: 278,200

[22] Filed: Jul. 21, 1994

Related U.S. Application Data

[63] Continuation-in-part of Ser. No. 80,602, Jun. 24, 1993, Pat. No. 5,380,586, which is a continuation of Ser. No. 812,493, Dec. 23, 1991, abandoned.

[51] Int. Cl.$^6$ .............. B32B 27/00; B32B 27/16; B32B 27/26; B32B 33/00
[52] U.S. Cl. .............. 428/35.4; 426/127; 427/471; 427/536; 427/209; 427/223; 427/307; 427/322; 427/412.1; 427/412.3; 427/412.5; 428/36.7; 428/476.1; 428/483; 428/500; 428/518; 428/910
[58] Field of Search .............. 428/476.1, 36.7, 428/35.4, 518, 520, 483, 910, 500; 427/471, 536, 209, 223, 307, 322, 412.1, 412.3, 412.5

[56] References Cited

U.S. PATENT DOCUMENTS

| | | | |
|---|---|---|---|
| 2,130,212 | 9/1938 | Watkins | 260/2 |
| 2,333,796 | 11/1943 | Kenyon | 260/73 |
| 2,362,026 | 12/1942 | Quist . | |
| 2,419,281 | 4/1947 | Noble | 260/90 |
| 2,897,092 | 7/1959 | Miller | 117/47 |
| 2,916,468 | 12/1959 | Yundt | 260/29.6 |
| 3,033,842 | 5/1962 | Holtschmidt | 260/91.3 |
| 3,099,646 | 7/1963 | Scardiglia et al. | 290/91.3 |
| 3,221,079 | 11/1965 | Harris | 260/844 |
| 3,232,916 | 2/1966 | Fogle | 260/91.3 |
| 3,275,575 | 9/1966 | Fogle | 260/2.2 |
| 3,282,729 | 11/1966 | Richardson et al. | 428/506 |
| 3,294,577 | 12/1966 | Mayer | 117/138.8 |
| 3,518,242 | 6/1970 | Chrisp | 260/91.3 |
| 3,702,844 | 11/1972 | Ofstead | 260/91.3 |
| 3,719,621 | 3/1973 | Vogt et al. | 260/30.4 |
| 3,719,629 | 3/1973 | Martin et al. | 260/33.2 |
| 4,055,698 | 10/1977 | Beery | 428/262 |
| 4,154,912 | 5/1979 | Philipp et al. | 526/7 |
| 4,214,039 | 7/1980 | Steiner et al. | 428/414 |
| 4,224,262 | 9/1980 | Baird, Jr. et al. | 264/22 |
| 4,235,365 | 11/1980 | Yoshii | 229/55 |
| 4,240,993 | 12/1980 | Sun | 264/22 |
| 4,254,169 | 3/1981 | Schroeder | 428/35 |
| 4,254,170 | 3/1981 | Roullet et al. | 428/36 |
| 4,272,470 | 6/1981 | Hsu et al. | 264/104 |
| 4,275,119 | 6/1981 | Weiner | 428/516 |

(List continued on next page.)

FOREIGN PATENT DOCUMENTS

0254468A2  1/1988  European Pat. Off. .

OTHER PUBLICATIONS

T. W. Modi, *Polyvinyl Alcohol*, in Handbook of Water-Soluble Gums and Resins, 20.1–20.32 (Robert L. Davidson ed., 1980).

Harold L. Jaffe and Franklin M. Rosenblum, *Poly(Vinyl Alcohol) for Adhesives*, in Handbook of Adhesives, 401–407 (Irving Skeist ed., 1990).

*Primary Examiner*—James C. Cannon
*Attorney, Agent, or Firm*—Alexander J. McKillop; Dennis P. Santini

[57] ABSTRACT

A polymeric film structure having improved oxygen, flavor/odor, grease/oil and moisture barrier characteristics is disclosed. The structure includes a polymeric core sandwiched between an oxygen barrier on one side thereof and a moisture barrier on the other side of the polymeric core. The oxygen barrier includes polyvinyl alcohol cross-linked with aldehyde containing cross-linking agents in the presence of a catalytic amount of an inorganic acid, preferably sulfuric acid. The moisture barrier is a coating of polyvinylidene chloride, which also enhances the oxygen barrier of the polymeric film structure.

17 Claims, 1 Drawing Sheet

U.S. PATENT DOCUMENTS

| | | | |
|---|---|---|---|
| 4,276,330 | 6/1981 | Stanley et al. | 428/35 |
| 4,277,572 | 7/1981 | Fujiwara et al. | 525/61 |
| 4,284,671 | 8/1981 | Cancio et al. | 428/35 |
| 4,288,477 | 9/1981 | Bordini et al. | 428/35 |
| 4,357,402 | 11/1982 | Sheibley et al. | 429/206 |
| 4,363,840 | 12/1982 | Roullet et al. | 428/35 |
| 4,376,183 | 3/1983 | Haskell | 524/417 |
| 4,416,938 | 11/1983 | Haskell | 428/289 |
| 4,418,119 | 11/1983 | Morrow et al. | 428/342 |
| 4,439,493 | 3/1984 | Hein et al. | 428/414 |
| 4,475,241 | 10/1984 | Mueller et al. | 383/113 |
| 4,564,559 | 1/1986 | Wagner, Jr. et al. | 428/349 |
| 4,565,742 | 1/1986 | Lang | 428/476.3 |
| 4,650,721 | 3/1987 | Ashcraft et al. | 428/516 |
| 4,719,147 | 1/1988 | Mauri | 428/336 |
| 4,725,646 | 2/1988 | Kobashi et al. | 525/61 |
| 4,731,266 | 3/1988 | Bonnebat et al. | 428/35 |
| 4,770,944 | 9/1988 | Farrell et al. | 428/474.4 |
| 4,785,049 | 11/1988 | Balaba et al. | 525/61 |
| 4,816,342 | 3/1989 | Farrell et al. | 428/475.5 |
| 4,883,698 | 11/1989 | Bothe et al. | 428/35.9 |
| 4,927,689 | 5/1990 | Markiewicz | 428/34.8 |
| 4,975,315 | 12/1990 | Bothe et al. | 428/216 |
| 5,102,699 | 4/1992 | Beeson et al. | 427/379 |
| 5,151,331 | 9/1992 | Beeson et al. | 428/475.5 |
| 5,175,036 | 12/1992 | Smiley et al. | 428/36.7 |
| 5,178,960 | 1/1993 | Cook | 428/461 |
| 5,196,269 | 3/1993 | Kittrell et al. | 428/513 |
| 5,225,288 | 7/1993 | Beeson | 428/475.5 |
| 5,230,963 | 7/1993 | Knoerzer | 428/520 |
| 5,252,384 | 10/1993 | Bothe et al. | 428/212 |
| 5,254,394 | 10/1993 | Bothe et al. | 428/212 |
| 5,286,424 | 2/1994 | Su et al. | 264/23 |

OXYGEN, FLAVOR/ODOR, GREASE/OIL AND MOISTURE BARRIER FILM STRUCTURES

CROSS REFERENCE TO RELATED APPLICATIONS

This application is a continuation-in-part of commonly assigned copending U.S. application Ser. No. 08/080,602, filed Jun. 24, 1993 now U.S. Pat. No. 5,380,586 which is a continuation of U.S. application Ser. No. 07/812,493 filed Dec. 23, 1991.

BACKGROUND OF THE INVENTION

The present invention relates to flexible polymeric film packaging structures with improved oxygen, flavor/odor, grease/oil and moisture barrier characteristics. More specifically, the invention relates to a film structure which includes a polymeric substrate, an oxygen barrier containing cross-linked polyvinyl alcohol ("PVOH") and a moisture barrier including a polyvinylidene ("PVdC") coating.

Certain polymeric films employed for the packaging of foods inherently permit the transmission of oxygen and moisture from the outside of the film to the inside of a food package wrapped with the film. Oxygen and/or moisture permit rapid deterioration of foods packaged in polymeric films. Exclusion of oxygen and moisture from packaged foods retards product spoilage. In certain applications, such as condiments packaging, it is important that the packaging film prevents the flavor of condiments from spreading outside. In other applications, it is important to protect the packaged contents against acquisition of odors or even other flavors from the outside. Therefore, film structures which can provide a barrier to oxygen, moisture, flavor/odor, and grease/oil loss or gain are highly desirable food packaging materials.

Attempts have been made in the past to provide polymeric films which have high oxygen, flavor/odor, grease/oil and moisture barrier. Some polymeric films disclosed in the prior art include PVOH. Polyvinyl alcohols are polymers containing (—$CH_2$—CHOH—) groups. They can be applied from water solution and are in many respects attractive materials for use as barrier coatings for thermoplastic polymer substrates. When applied to thermoplastic polymer surfaces which have been treated by any of a number of means to render them receptive to coatings, polyvinyl alcohols adhere tenaciously, are flexible, clear and transparent, provide an oxygen impermeable barrier, and are resistant to permeation by greases, oils and a wide variety of common organic solvents, such as esters, ethers, ketones, hydrocarbons and chlorinated hydrocarbons.

The advantage of water solubility in the application of PVOH as a barrier coating becomes its chief drawback, however, when the barrier coating has been formed on a thermoplastic polymer substrate. The poor water resistance of PVOH restricts its use as a barrier coating to those few applications where nearly anhydrous conditions prevail. Moisture may act to cause staining or wear due to friction, an unpleasant feel to the touch and a dull appearance. It is also known that oxygen and flavor/odor, grease/oil permeability of PVOH increases in proportion to its moisture content.

A number of methods have been known for increasing the water resistance of PVOH, but none provides entirely satisfactory results. In spite of various heretofore practiced methods, such as cross-linking PVOH with potassium dichromate, formaldehyde or phenol-formaldehyde resins, the polyvinyl alcohol still tends to soften, swell and lose adhering strength when exposed to water or even moisture vapor. Hence, barrier coatings consisting only of polyvinyl alcohol cannot be used where a substantial degree of water-resistance or moisture-proofness is required.

Accordingly, there is still a need in the art of packaging films to provide a film structure which has excellent oxygen, flavor/odor, grease/oil and moisture barrier characteristics.

It is, therefore, an object of the present invention to provide new packaging film structures containing a film which has excellent oxygen barrier and flavor/odor, grease/oil characteristics present in a film combination including cross-linked PVOH coated with a material having high moisture barrier characteristics, such as polyvinylidene chloride ("PVdC").

SUMMARY OF THE INVENTION

The present invention, which addresses the needs of the prior art, provides packaging film structures which have both low oxygen, flavor/odor, grease/oil transmissive characteristics and high moisture barrier properties.

More specifically, it has now been found that by coating a film combination which has low oxygen transmissive properties with polyvinylidene chloride coating, a film structure is provided which has enhanced oxygen, flavor/odor, grease/oil and moisture barrier characteristics. The film structure has a polymeric core which has both surfaces treated to receive other coatings. The surface treatment is accomplished by well known methods in the art, corona or flame treatment being preferred. Both surfaces of the polymeric core may then be primed. Poly (etyleneimine) is used for the PVOH receiving surface, and epoxy is used for the PVdC receiving surface. Once treated and primed, the polymeric core is provided on one surface with a cross-linked PVOH layer and on the other surface, the polymeric core is coated with PVdC. The polymeric core may be oriented polyethylene terephthalate, nylon, oriented polypropylene and polyethylene. The core may also include a coextruded propylene-ethylene copolymer skin.

The present invention also provides a process of preparing packaging film structures having improved oxygen, flavor/odor, grease/oil and moisture barrier properties. The process includes coating at least one surface of the primed, surface treated polymeric substrate with an aqueous solution of PVOH, aldehyde-containing cross-linking agent in the presence of a catalytic amount of sulfuric acid and allowing the polyvinyl alcohol to cross-link thus forming an oxygen flavor/odor, and grease/oil barrier. The aqueous solution of PVOH includes a solid content comprising from about 62.5% to about 95% by weight of PVOH, from about 5% to about 30% by weight of cross-linking agent and up to 7.5% by weight of acid catalyst. A coating of PVdC is then applied and the resulting film is dried. Packaging film structures obtained by the above process are also encompassed in the present invention.

As a result of the present invention, packaging film structures are provided which have excellent oxygen, flavor/odor, grease/oil and moisture barrier properties. Additionally, the film structure is also transparent and heat sealable. These film structures have been found to be especially useful in packaging condiments and various sauces, such as tomato sauce and the like. The film is quite sturdy. It may be used as a single, i.e., a mono web to form larger packages to replace, for example, the 110 ounce tin can, ordinarily used to package tomato sauce for institutions. In most applications mono webs cannot be used by themselves because they are not sufficiently sturdy, rupture easily and have insufficient barrier properties. For many applications, the film structure consists of at least two coextruded mono webs. By using a mono web the coextrusion lamination step is eliminated and significant cost savings can be realized. Moreover, because the package is also transparent the end user can X-ray scan it or otherwise inspect its contents.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

Figure 1:
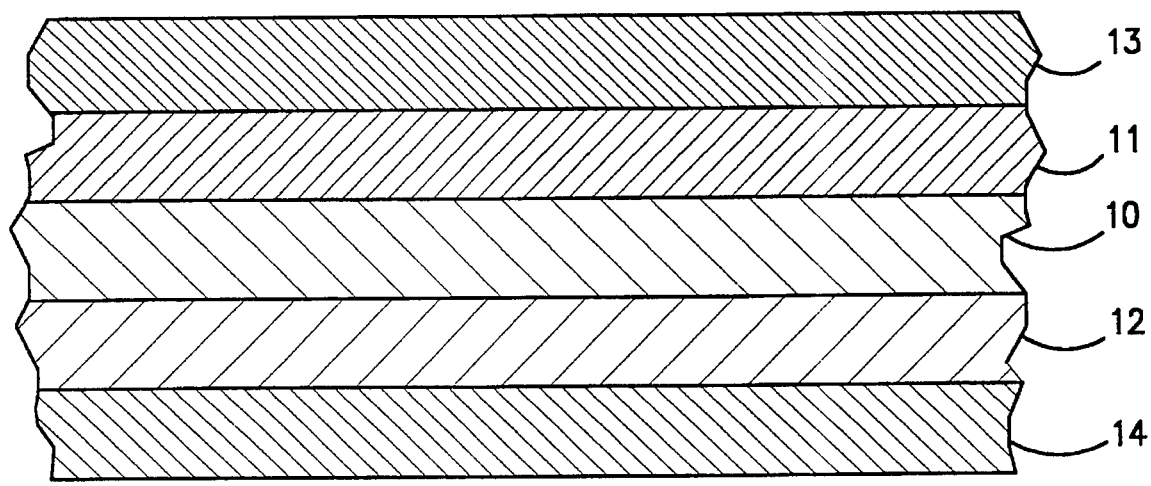
FIG. 1 illustrates one embodiment of the present invention, wherein primer coatings have been applied to both surfaces of the polymeric core.

Certain barrier film combinations have excellent oxygen barrier properties. However, for certain commercial applications, the moisture barrier properties of these films can be improved. U.S. application Ser. No. 08/080,602 filed Jun. 24, 1993, incorporated herein by reference, (the "parent application"), discloses excellent oxygen barrier film combinations having at least one layer of PVOH cross-linked with a cross-linking agent in the presence of a catalytic amount of sulfuric acid.

Although the resulting film combination of the parent application has excellent oxygen barrier characteristics, there are commercial applications in which it is desirable to provide a film combination exhibiting other beneficial properties such as flavor/odor, grease/oil and moisture barrier characteristics. The present application provides a polymeric film structure including oxygen, flavor/odor, grease/oil and moisture barriers. The oxygen barrier includes cross-linked PVOH and the moisture barrier includes a PVdC layer. The oxygen barrier is applied to one surface of the polymeric core and the moisture barrier is applied to the other surface of the polymeric core. In addition, the entire film structure also provides an excellent flavor/odor and grease/oil barrier.

The polymeric materials contemplated as the core of the multilayer structure of the present invention include any polymeric film oriented or unoriented which inherently permits the transmission of oxygen, flavor/odor and grease/oil wherein the utility of such film would call for a minimization of the transmission of oxygen, flavor/odors and grease/oil. In most cases, the source of the oxygen referred to herein is atmospheric oxygen. The source of flavor is the condiment flavor and the source of odors is from the environment. While nylon, polyethylene terephthalate ("PET"), polycarbonate films are contemplated herein, a particularly preferred class of films are the polyolefins. Within the polyolefin class, homopolymers and copolymers of propylene, low density ("LDPE") and linear low density polyethylene ("LLDPE") are preferred. High density polyethylene ("HDPE") may also be used. Particularly preferred are isotactic polypropylenes containing at least 80% by weight of isotactic polypropylene. The preferred core can be homopolypropylene having a melting point range of from about 321°–336° F. A commercially available material of this description is ARCO W472 or FINA3371 manufactured by Fina Chemical Co., Texas. The preferred core layer can also be coextruded with a thin skin layer, amounting to from about 2 to about 12% of the total thickness, of a copolymer of propylene and another olefin, e.g., ethylene, butene-1. The other olefin which can be present in the copolymer is in an amount of from about 1–7 wt %.

The polymeric core can be of any desired thickness, although thicknesses will typically range from about 0.7 to about 3 mils to ensure good machinability on high-speed packaging equipment. The OPP film should preferably have a thickness of 1.75 mil.

It has been found advantageous to treat the core or base layer prior to receiving the oxygen and moisture barrier layers. Such treatment enhances the adhesion of other coatings.

A preferred treatment involves treating the surface to a surface tension level of at least about 35 and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred with corona discharge treatment being particularly preferred.

After this treatment, a suitable primer material is coated onto the treated surface. Preferred primer materials are those disclosed in U.S. Pat. No. 4,564,559 incorporated herein by reference as if set forth in full herein. These include a primer produced by condensing a monoaldehyde with an interpolymer of acrylamide or methacrylamide and at least one other unsaturated monomer. Further included is a primer material produced by condensing aminoaldehyde with acrylamide or methacrylamide and subsequently interpolymerizing the condensation product with at least one other unsaturated monomer in the presence of a $C_1$-$C_6$ alkanol.

A particularly preferred primer material for the structure contemplated herein has been found to be poly(ethyleneimine). The imine primer provides an overall adhesively active surface for thorough and secure bonding with the subsequently applied cross-linked polyvinyl alcohol on one surface of the core substrate and the polyvinylidene chloride on the other surface of the substrate. It has been found that an effective coating solution concentration of the poly(ethyleneimine) applied from either aqueous or organic solvent media, such as ethanol, is a solution comprising about 0.1–0.6% by weight of the poly(ethyleneimine). A commercially available material of this type is known as Polymin P, a product of BASF-Wyandotte Corporation.

Another particularly preferred primer material is the reaction product of an epoxy resin as a first component with an acidified aminoethylated vinyl polymer as the second component. The contemplated epoxy resins are glycidyl ethers of polyhydroxy compounds, such as resorcinol, hydroquinone, Novolac® resins, and the like.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer composition of the present invention is an amino modified acrylic polymer which is water soluble. This polymer is a curing agent for the epoxy compound. The preferred material is described in U.S. Pat. No. 3,719,629, the disclosure of which is incorporated herein by reference.

In one embodiment of the present invention, a liquid epoxy resin is emulsified in a solution of the curing agent by rapid stirring, the resultant dispersion is diluted with water to the desired concentration for coating, usually from about 2 to about 20% solids. When mixing the epoxy resin with the curing agent, it is generally preferred to use a stoichiometric equivalent balance of epoxy and amine groups. However, it has been found that the stoichiometric ratio may be varied over a wide range, from about 1 epoxy to about 3 amine groups through 3 epoxy groups to 1 amine group. Any of the above described primers can be employed in the range of about 0.001 to 3.5 g/m$^2$.

Polyvinyl alcohol ("PVOH") as used in the present invention and claims refers to a normally solid polymeric material, soluble in water, but insoluble in most organic solvents and characterized by the presence of (—CH$_2$—CHOH—) units in the polymer chain. These polymers are ordinarily prepared by the replacement of the acetate groups of polyvinyl acetate with hydroxyl groups as by hydrolysis or alcoholysis. The percent of acetate groups replaced by hydroxyl groups is the degree of hydrolysis PVOH thus formed and indicates the percent of hydroxyl groups present in PVOH out of the total possible hydroxyl groups. As explained hereinbelow the cross-linking reaction by which the superior barrier coatings of this invention are obtained proceeds through the hydroxyl groups of PVOH. Therefore, only substantially completely hydrolyzed PVOH are useful in this invention. By the term "substantially completely hydrolyzed" in the present specification and claims is meant a degree of hydrolysis of above about 85%. We have found that PVOH having an hydroxyl content above 88% and particularly above about 95% provide superior resistance, clarity and flexibility and adhering strength. Hydroxyl group contents of 99% to 100% provide the best barrier coatings and are particularly preferred for use in this invention.

The PVOH employed herein can be any commercially available material. For example, ELVANOL 71–30 or ELVANOL 90–50 are E.I. dupont products.

The PVOH coating solution is prepared by dissolving the polymer in hot water, cooling and mixing both with a suitable cross-linking agent and sulfuric acid as the catalyst. The cross-linking agent can be a melamine- or urea-formaldehyde resin. Commercially available crosslinkers also would include PAREZ 613, a methylated melamine formaldehyde; CYMEL 373, a methylated melamine formaldehyde; CYMEL 401, a trimethylol melamine urea formaldehyde; all obtainable from American Cyananid Corporation glyoxal, and borax. Sulfuric acid as the cross-linker catalyst has been discovered to be far superior to nitric acid, ammonium chloride and ammonium nitrate.

Cross-linking is carried out to make the PVOH less moisture sensitive but it is essential that this does not occur before the coating weight is applied and evenly distributed. This is effected by making up the aqueous solution so that the initial concentration is too low for this to occur but, as drying occurs, the concentration increases and the rate of cross-linking also increases.

Suitable concentrations have been found to be from 1 to 35 wt. %, preferably from 4 to 8 wt % of the solution, which are PVOH plus cross-linking agent-plus sulfuric acid in a catalytically active amount. If the solids content is higher, the solution becomes too viscous; if lower, good water resistance is not obtained. From about 5% to 30%, typically 15% cross-linking agent is used with from 0.1% to 7.5%, typically 2% of the sulfuric acid catalyst. A preferred formulation comprises the following solids content: 85.5 wt % PVOH; 12.8 wt % methylated melamine formaldehyde; and 1.7 wt % sulfuric acid. The sulfuric acid employed can have a strength ranging from about 0.1 to 20 wt. %.

Aqueous PVOH solutions were prepared by dissolving sufficient ELVANOL 71-30 in hot water to form 8 wt % solutions which were then cooled. To these solutions were added a 20 wt % aqueous melamine formaldehyde solution and the appropriate amount of solution of aqueous ammonium chloride, sulfuric acid, ammonium sulfate, ammonium nitrate and nitric acid solutions to provide the formulations shown in the Table 1 below. Cross-linked PVOH can be present in from about 0.2 to 3 g/m$^2$.

The cross-linked PVOH coated films described above are intended to be adhesively laminated to either oriented or unoriented commercially available thermoplastic films such as homopolymer polypropylene film, polypropylene with coated layers, polypropylene with slip additives, polypropylene with coextruded layers, opaque polypropylene, polyethylene, nylon, polyethylene terephthalate, polycarbonate, polystyrene, etc. A preferred class of films are the polyolefins. Most preferred is a polymeric substrate of OPP having a thickness of 1.50 mil.

The cross-linked PVOH coated films described above may be coated with other coatings to enhance other desirable properties, such as moisture barrier properties. PVdC is a particularly preferred coating that could be applied to the above cross-linked PVOH film combination. The resulting film has excellent oxygen, flavor/odor, grease/oil and moisture barrier properties. Additionally, the film is also heat sealable, and quite sturdy. The PVdC coated film of the present invention can be used as a mono web providing the user with significant cost savings.

PVdC also more correctly referred to as copolymers of vinylidene chloride ("PVdC" or "VdC copolymers") are copolymers of 65 to 96% by weight of vinylidene chloride and 4 to 35% of one or more comonomers such as vinyl chloride, acrylonitrile, methacrylonitrile, methyl methacrylate, or methyl acrylate, hereafter referred to as PVdC. A suitable grade contains about 7 weight percent methacrylonitrile, 3 weight percent methyl methacrylate, and 0.3 weight percent itaconinic acid comonomers. PVdC customarily include formulation additives such as waxes, fatty acids and derivatives thereof, particulate matter, and polymeric species such as mixed polyesters. Such additives may be useful to reduce brittleness and stiffness of the polymer or to improve its heat sealability and handling properties. Commercially available VdC copolymers useful for the present invention are manufactured by Morton Co.

The cross-linked PVOH film combination described in the parent application has excellent oxygen barrier properties even under conditions of high relative humidity. By adding another layer of PVdC on the other surface of the polymeric substrate which is opposite the cross-linked PVOH bearing surface, the moisture barrier of the film combination is significantly improved. For example, an uncoated film had an oxygen transmission rate ("TO$_2$") in excess of 150 cc/100 in$^2$/24 hr. at 75° F., 0% relative humidity ("RH")/and a water vapor transmission rate ("WVTR") of 0.360 gm/100 in$^2$/24 hr at 100° F. 90% RH. A film combination according to the present invention coated with both cross-linked PVOH and PVdC had a $TO_2$ of 0.020 cc/100 in$^2$/24 hr at 75° F., 75% RH. The WVTR was 0.120 gm/100 in$^2$/24 hr at 100° F.

FIG. 1 shows a schematic cross section of a film prepared by the present invention. Layer 10 represents the treated polymeric core which is coated with a poly(ethyleneimine) layer 11 on one surface and dry epoxy primer 12 on the other surface. The cross-linked PVOH layer 13 is adhered to the surface bearing poly(ehtyleneimine) primer and the PVdC layer 14 is adhered to the other epoxy coated surface.

The PVOH/PVdC film structure described above is used as a mono web and thus provides more cost effective packaging than other films which require more than one web. A mono web is a term adapted by plastic resin processors to denote a single plastic film, not as a final discrete article but as a long film somewhere in the processing stage, frequently being drawn off a large roll of printed film. When used as a mono web where PVdC is the sealant layer coming in contact with the food product, the cross-linked PVOH layer can also be printed.

In applications where the food being packaged requires a light barrier a white film may be applied to the crosslinked PVOH or the PVdC layer. Commercially available opaque polypropylene from Mobil Chemical, Films Division, is a preferred white film.

When higher barrier or a stronger packaging film is required, the cross-linked PVOH layer may be laminated to another film that provides improved strength and barrier. Such films include, PET, nylon and polyolefins. For improved sealability either surface may be further laminated with a layer of polyethylene.

The PVOH/PVdC film structures of the present invention are transparent so that packaged condiments and sauces can be freely inspected and scanned for contaminants.

EXAMPLES

The following examples serve to provide further appreciation of the invention but are not meant in any way to restrict the effective scope of the invention.

EXAMPLE 1

A homopolymer polypropylene core layer is coextruded with skin layers of an ethylene-propylene random copolymer. The random copolymer contains approximately 3–5% by weight of ethylene. The extruded film is biaxially oriented to 4–5 times machine direction and 7–10 times transverse direction to yield a film having a thickness of approximately 1 mil. The thickness of the skin layers is approximately 8% of the film and are approximately of equal thickness. This film combination is corona discharge treated in accordance with commonly employed prior art techniques to produce a surface with a wetting tension of about 42 dynes/cm. The treated film is precoated on one side with 0.1 wt % poly(ethyleneimine), as manufactured by BASF-Wyandotte Corporation Polyamin P product and on the other with epoxy of about 0.075 g/m$^2$. The film is air-dried at 100° C. This coating weight is too low to be measured, but is calculated to be in the range of 0.002 gm$^2$ by optical density. The primer coated treated substrate is then coated on one surface with a PVdC coating weight of about 4.5 g/m$^2$. The PVdC coating is a 50 wt % aqueous latex solution resulting from the polymerization of VdC with methyl acrylic acid. The opposite surface of this film structure was then coated with the appropriate solution of PVOH, cross-linking agent and catalyst. The solutions were applied utilizing a reverse direct gravure coater and the coated film is passed through a dry-air oven at from 100°–125° C. This produces a coating weight of 0.5 g/m$^2$. The thickness of the polymeric film structure of the present invention including both PVOH and PVdC is about 1.7 mil.

The dried films are then tested in an oxygen-permeability device in which a stream of dry oxygen is passed through an aqueous salt solution-permeated pad to control the gas moisture content and then through the films, disposed at right angles to the stream with the cross-linked PVOH coating upstream. The oxygen transmitted was determined and the amount of oxygen passed per unit area of film per time period is calculated.

Samples bearing cross-linked PVOH layer obtained by using sulfuric acid catalyzed systems were superior to any other catalyzed system for inhibiting the transmission of oxygen through packaging films. The rubbing resistance of the sulfuric acid catalyzed film combinations was also outstanding. Oxygen transmission and rubbing resistance rates for several samples bearing PVOH cross-linked in the presence of methylated melamine formaldehyde, ammonium chloride and sulfuric acid are set forth in Table 1 below.

TABLE 1

| SAMPLE CODE | CATALYST (PHR) | P 613[1] XLINK (PHR) | RUBBING[2] RESISTANCE | | | $TO_2$ (CC/100 IN$^2$/24 HR)[3] | |
|---|---|---|---|---|---|---|---|
| | | | 0 WK | 1 WK | 3 WK | AT 75% RH 1 WK | APP. 50% RH 3 WK |
| 1 | NH$_4$Cl:2.0 | 15 | 100 | 70 | 50 | 7.07 | 11.00 |
| 2 | NH$_4$Cl:2.0 | 15 | 100 | 70 | 50 | 9.94 | — |
| 3 | NH$_4$Cl:2.5 | 20 | 70 | 70 | 70 | 8.63 | — |
| 4 | (NH$_4$)$_2$SO$_4$:1.5 | 10 | — | — | 100 | — | 8.20 |
| 5 | (NH$_4$)$_2$SO$_4$:3.0 | 25 | — | — | 100 | — | 5.80 |
| 6 | NH$_4$NO$_3$:1.5 | 10 | — | — | 0 | — | 5.60 |
| 7 | HNO$_3$:1.5 | 10 | — | — | 70 | — | 9.00 |
| 8 | Nil | Nil | 100 | 100 | 100 | 4.64 | 7.03 |
| 9 | H$_2$SO$_4$:2.0 | 15 | 50 | 30 | 0 | 4.19 | 3.53 |
| 10 | H$_2$SO$_4$:2.0 | 25 | 50 | 50 | 0 | 4.69 | 3.86 |
| 11 | H$_2$SO$_4$:2.0 | 20 | 50 | 30 | 0 | 3.14 | 3.24 |
| 12 | H$_2$SO$_4$:3.0 | 20 | 10 | 0 | 0 | 1.69 | 2.78 |
| 13 | H$_2$SO$_4$:3.0 | 25 | — | — | 0 | — | 3.10 |

[1]Parex 613, a methylated melamine formaldehyde.

TABLE 1-continued

| SAMPLE CODE | CATALYST (PHR) | P 613[1] XLINK (PHR) | RUBBING[2] RESISTANCE 0 WK | 1 WK | 3 WK | TO$_2$ (CC/100 IN$^2$/24 HR)[3] AT 75% RH 1 WK | APP. 50% RH 3 WK |
|---|---|---|---|---|---|---|---|

[2]% of coating removed.
[3]Oxygen transmission rate.

Table 1 illustrates that samples bearing PVOH crosslinked with sulfuric acid have oxygen transmission rate and rubbing resistance values far superior to those cross-linked with ammonium chloride.

After testing for oxygen permeability is completed the films are tested for moisture barrier by measuring the water vapor transmission rate ("WVTR").

TO$_2$ and WVTR values for an uncoated OPP film, an OPP film coated only with cross-linked PVOH and an OPP film coated with both cross-linked PVOH and PVdC are set forth in Table 2 below. The WVTR was measured as described in ASTM F372.

TABLE 2

| SUBSTRATE | SUBSTRATE[1] THICKNESS | BARRIER LAYER | THICKNESS OF[1] BARRIER LAYER | TO$_2$[2] | TO$_2$[3] | WVTR[4] |
|---|---|---|---|---|---|---|
| Uncoated OPP | 1.00 | None | 1.00 | 150 | 150 | 0.360 |
| Coated OPP | 1.00 | Cross-linked PVOH | 0.04 | 0.03 | 3.1 | 0.360 |
| Coated OPP | 0.70 | PVdC | 0.15 | 0.30 | 0.52 | 0.150 |
| Coated OPP | 1.00 | Cross-linked PVOH/PVdC | 0.04 PVOH + 0.15 PVdC | 0.005 | 0.02 | 0.12 |

[1]The thickness is measured in mil.
[2]Average oxygen transmission rate measured in cc/100 in$^2$/24 hr. at 75° F., 0% RH.
[3]Average oxygen transmission rate measured in cc/100 in$^2$/24 hr. at 75° F., 75% RH.
[4]Water vapor transmission rate measured in gm/100 in$^2$/24 hr. at 100° F., 90% RH.

As illustrated in Table 2, an uncoated OPP film shows a high oxygen transmission rate as a result of poor oxygen barrier properties. The oxygen transmission rate is significantly decreased by the addition of a layer of cross-linked PVOH. In addition, when a core layer of OPP is sandwiched between a layer of cross-linked PVOH and a layer of PVdC, in accordance with the method provided by the present invention, both the oxygen barrier and the moisture barrier properties of the resulting film structure are considerably enhanced. Also, the oxygen barrier properties of the PVdC are largely insensitive to moisture, i.e., relative humidity independent. Therefore, even under very extreme conditions, where the barrier properties of the PVOH have been degraded, the PVdC maintains the oxygen transmission rate at less than 1.00 cc/100 in$^2$/24 hr 100% RH.

Moreover, the use of two oxygen barrier layers minimizes the chances of two pin holes from occurring in the lining up of the coating. This reduces the oxygen transmission rate by an amount greater than ordinarily expected.

Thus, while there have been described what are presently believed to be the preferred embodiments of the present invention, those skilled in the art will realize that other and further modifications can be made without departing from the true spirit of the invention and is intended to include all such modifications and variations as come within the scope of the claims as set forth below.

We claim:

1. A polymeric film structure which comprises:

(I) a polymeric core having a first treated surface adapted to receive an oxygen barrier and a second treated surface adapted to receive a moisture barrier, wherein said first treated surface and said second treated surface have been treated by a surface treatment selected from the group consisting of flame treatment, plasma treatment, chemical treatment and corona discharge treatment, said polymeric core is selected from the group consisting of oriented polyprolylene, polyethylene, polyethylene terephthalate, nylon and cast polypropylene and said first and second treated surfaces have had applied thereto a primer coating compatible with, respectively, a cross-linked polyvinyl alcohol oxygen barrier coating and a polyvinylidene chloride moisture barrier coating;

(II) a coating of polyvinyl alcohol cross-linked with an aldehyde containing cross-linking agent in the presence of a catalytic amount of sulfuric acid adhered to said first treated surface to provide an oxygen barrier, wherein said aldehyde containing cross-linking agent is selected from the group consisting of urea formaldehyde, melamine formaldehyde, methylated melamine formaldehyde and trimethylol melamine urea formaldehyde; and (III) a coating of polyvinylidene chloride adhered to said second treated surface of said polymeric core to provide said moisture barrier and to enhance said oxygen barrier, whereby said polymeric film structure has enhanced oxygen, flavor/odor, grease/oil and moisture barrier properties.

2. The film structure of claim 1, wherein said oxygen barrier includes from about 62.5 to about 95 by weight of said polyvinyl alcohol, and from about 5 to about 30 by weight of said cross-linking agent.

3. The film structure of claim 1, wherein said oxygen barrier layer was produced using from about 0.5 to about 7.5% by weight of said acid catalyst.

4. The film structure of claim 1, wherein said polymeric core further comprises a coextruded propylene-ethylene copolymer layer skin on at least one surface thereof.

5. The film structure of claim 1, wherein said polymeric core further comprises a primer layer on at least one surface thereof, said primer selected from the group consisting of a primer produced by condensing a monoaldehyde with an interpolymer of acrylamide or methacrylamide and at least one other unsaturated monomer; a primer produced by condensing aminoaldehyde with acrylamide or methacrylamide and interpolymerizing the condensation product with another unsaturated monomer in the presence of a $C_1$-$C_6$ alkanol; poly(ethyleneimine); and the reaction product of an epoxy resin and an acidified aminoethylated vinyl polymer.

6. The film structure of claim 1, further comprising an opaque layer coated onto said oxygen barrier or coated onto said moisture barrier layer.

7. The film structure of claim 6, wherein said opaque layer is selected from the group consisting of a cavitated polyolefin and a mixture of cavitated polyolefins.

8. The film structure of claim 1, further comprising a layer laminated onto said oxygen barrier.

9. The film structure of claim 8, wherein said layer is selected from the group consisting of polyethylene terephthalate, oriented polyvinylidene, nylon, low density polyethylene, linear low density polyethylene and high density polyethylene.

10. The film structure of claim 8, wherein said layer is selected from the group consisting of paper, paperboard and fiberboard.

11. A polymeric film structure which comprises:
   (I) a polymeric core having a first surface adapted to receive an oxygen barrier and a second surface adapted to receive a moisture barrier said adaptions having been effected by subjecting both the first and second surfaces to a treatment selected from the group consisting of flame treatment, plasma treatment chemical treatment and corona discharge treatment and thereafter applying to said first and second surfaces, respectively, a primer coating compatible with a cross-linked polyvinyl alcohol coating and a primer coating compatible with a coating of polyvinylidene chloride;
   (II) a coating of polyvinyl alcohol cross-linked with an aldehyde containing cross-linking agent in the presence of a catalytic amount of sulfuric acid adhered to said first surface to provide an oxygen barrier; and
   (III) a coating of polyvinylidene chloride adhered to said second surface of said polymeric core to provide said moisture barrier and to enhance said oxygen barrier
   (IV) a layer of polyethylene laminated onto either said oxygen barrier or said moisture barrier,
whereby said polymeric film structure has enhanced oxygen, flavor/odor, grease/oil moisture barrier and heat seal properties.

12. A polymeric film structure having enhanced oxygen, flavor/odor, grease/oil, moisture barrier and heat seal properties which comprises:
   (I) a polymeric core having a first surface adapted to receive an oxygen barrier and a second surface adapted to receive a moisture barrier said adaptions having been effected by subjecting both the first and second surfaces to a treatment selected from the group consisting of flame treatment, plasma treatment, chemical treatment and corona discharge treatment and thereafter applying to said first and second surfaces, respectively, a primer coating compatible with a cross-linked polyvinyl alcohol coating and a primer coating compatible with a coating of polyvinylidene chloride;
   (II) a coating of polyvinyl alcohol cross-linked with an aldehyde containing cross-linking agent in the presence of a catalytic amount of sulfuric acid adhered to said first surface to provide an oxygen barrier;
   (III) a coating of polyvinylidene chloride adhered to said second surface of said polymeric core to provide said moisture barrier and to enhance said oxygen barrier
   (IV) a film of polymeric material laminated onto said layer of cross-linked polyvinyl alcohol, said polymeric material being selected from the group consisting of nylon, polyolefins and PET.

13. A polymeric film structure having enhanced oxygen, flavor/odor, grease/oil and moisture barrier characteristics which comprises:
   (I) a polymeric core having a first surface adapted to receive an oxygen barrier and a second surface adapted to receive a moisture barrier said adaptions having been effected by subjecting both the first and second surfaces to a treatment selected from the group consisting of flame treatment, plasma treatment, chemical treatment and corona discharge treatment and thereafter applying to said first and second surfaces, respectively, a primer coating compatible with a cross-linked polyvinyl alcohol coating and a primer coating compatible with a coating of polyvinylidene chloride;
   (II) a coating of polyvinyl alcohol cross-linked with an aldehyde containing cross-linking agent in the presence of a catalytic amount of sulfuric acid adhered to said first surface to provide an oxygen barrier; and
   (III) a coating of polyvinylidene chloride adhered to said second surface of said polymeric core to provide said moisture barrier and to enhance said oxygen barrier whereby said polymeric film structure has enhanced oxygen, flavor/odor, grease/oil and moisture barrier properties,
wherein said film structure has an oxygen transmission rate from about 0.005 cc/100 $in^2$/24 hr. at 75° F., 0% relative humidity to about less than 1.00 cc/100 $in^2$/24 hr.

14. A polymeric film structure having enhanced oxygen, flavor/odor, grease/oil and moisture barrier properties produced by the following steps:
   (i) treating both surfaces of a polymeric core by flame treatment, plasma treatment, chemical treatment or corona discharge treatment;
   (ii) coating one treated surface of said polymeric core with a first primer coating adapted to receive an oxygen barrier coating;
   (iii) coating the other treated surface of said polymeric core with a second primer coating adapted to receive a moisture barrier coating;
   (iv) coating said surface adapted to receive an oxygen coating with an aqueous solution of polyvinyl alcohol, a formaldehyde-containing cross-linking agent selected from the group consisting of urea formaldehyde, melamine formaldehyde, methylated melamine formaldehyde and trimethyl melamine urea formaldehyde and a catalytic amount of sulfuric acid;
   (v) cross-linking said polyvinyl alcohol to provide said enhanced oxygen, flavor/odor, grease/oil and moisture barrier; and
   (vi) coating said other treated and primed surface of said polymeric core with polyvinylidene chloride moisture barrier coating.

15. The polymeric film structure of claim 14, wherein said polymeric core is selected from the group consisting of oriented polypropylene, polyethylene, polyethylene terephthalate, nylon and cast polypropylene.

16. The film structure of claim 14, wherein said aqueous solution includes a solid content comprising from about 62.5% to about 95% by weight of said polyvinyl alcohol, from about 5% to about 30% by weight of said cross-linking agent and up to about 7.5% by weight of said acid catalyst.

17. The film structure of claim 14, wherein said polymeric core has been treated to a surface free energy of at least 35 dynes/cm.

* * * * *